US010831479B2

(12) United States Patent
Slegel et al.

(10) Patent No.: US 10,831,479 B2
(45) Date of Patent: Nov. 10, 2020

(54) INSTRUCTION TO MOVE DATA IN A RIGHT-TO-LEFT DIRECTION

(71) Applicant: INTERNATIONAL BUSINESS MACHINES CORPORATION, Armonk, NY (US)

(72) Inventors: Timothy Slegel, Staatsburg, NY (US); John R. Ehrman, Sunnyvale, CA (US); Dan Greiner, San Jose, CA (US); Anthony Saporito, Highland, NY (US); Aaron Tsai, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 23 days.

(21) Appl. No.: 16/280,616

(22) Filed: Feb. 20, 2019

(65) Prior Publication Data

US 2020/0264878 A1    Aug. 20, 2020

(51) Int. Cl.
*G06F 9/30*    (2018.01)

(52) U.S. Cl.
CPC ...... *G06F 9/30032* (2013.01); *G06F 9/30098* (2013.01)

(58) Field of Classification Search
None
See application file for complete search history.

(56) References Cited

U.S. PATENT DOCUMENTS

| 5,138,617 | A | | 8/1992 | Edwards |
| 5,339,419 | A | * | 8/1994 | Chan ................ G06F 8/47 717/147 |
| 5,390,328 | A | | 2/1995 | Frey et al. |
| 5,644,761 | A | | 7/1997 | Yoder et al. |
| 5,835,740 | A | * | 11/1998 | Wise ................ G06F 9/3867 712/200 |
| 6,112,017 | A | * | 8/2000 | Wise ................ G06F 9/3867 712/200 |
| 6,185,621 | B1 | * | 2/2001 | Romine ............ H04N 21/2182 348/E5.008 |
| 7,895,560 | B2 | | 2/2011 | Lovell |
| 2006/0101258 | A1 | * | 5/2006 | Jones ................ G06F 9/30018 712/300 |

(Continued)

FOREIGN PATENT DOCUMENTS

| GB | 2411978 A | 9/2006 |
| GB | 2438229 A | 11/2007 |

OTHER PUBLICATIONS

Anonymous, "A Method to Verify Left-to-Right Store Access," IP.com No. IPCOM000223110D, Nov. 5, 2012, pp. 1-2 (+ cover).

(Continued)

*Primary Examiner* — Michael Sun
(74) *Attorney, Agent, or Firm* — Steven Chiu, Esq.; Blanche E. Schiller, Esq.; Heslin Rothenberg Farley & Mesiti P.C.

(57) ABSTRACT

A single architected instruction to move data is executed. The executing includes moving data of a specified length from a source location to a destination location in a right-to-left sequence to provide a predictable result. A predictable result is provided, even though a portion of the destination location is contained within the source location from which the data is being moved.

20 Claims, 9 Drawing Sheets

(56) References Cited

U.S. PATENT DOCUMENTS

| | | | | |
|---|---|---|---|---|
| 2007/0291662 | A1* | 12/2007 | Mangin | H04L 63/1441 370/252 |
| 2009/0182985 | A1* | 7/2009 | Greiner | G06F 9/3879 712/205 |
| 2012/0260068 | A1* | 10/2012 | Henry | G06F 9/30196 712/200 |
| 2015/0277910 | A1* | 10/2015 | Grochowski | G06F 9/3005 712/234 |
| 2016/0224465 | A1* | 8/2016 | Morad | G06F 9/3887 |
| 2017/0242943 | A1* | 8/2017 | Meixner | G06F 30/20 |
| 2018/0253302 | A1 | 9/2018 | Gschwind | |

OTHER PUBLICATIONS

Anonymous, "Method for Differentiated Instruction Rendering in Personal Routing Assistant Systems," IP.com No. IPCOM0002073840, May 30, 2011, pp. 1-3 (+ cover).

Anonymous, "Method for Navigation Instruction Communication Method Selection," IP.com No. IPCOM000253180D, Mar. 12, 2018, pp. 1-5 (+ cover).

Brown, Judson S. et al., "Discrete Movements in the Horizontal Plane As a Function of Their Length and Direction," 2012 (no further date information available), pp. 84-95.

Bull HN Information Systems, Inc., "Large Systems—Assembly Instruction DPS 8000," Mar. 1987, pp. 8-350-8-351 and 8-373-8-377 (+ cover sheets).

IBM, "z/Architecture—Principles of Operation," IBM Publication No. SA22-7832-11, Twelfth Edition, Sep. 2017, pp. Jan. 1902.

Intel Corporation, "Introduction to the Intel® Nios® Soft Processor," Intel Corporation—FPGA Program, Jun. 2017, pp. 1-27.

Mell, Peter and Tim Grance, "The NIST Definition of Cloud Computing," National Institute of Laboratory, Special Publication 800-145, Sep. 2011, pp. 1-7.

Intel, "Intel 64 and IA-32 Architecture Software Developer's Manual—vol. 2 (2A, 2B, 2C & 2D): Instruction Set Reference, A-Z," Order No. 325383-060US, Sep. 2016, pp. 4-107-4108 (+ cover sheets).

* cited by examiner

OBTAIN AN INSTRUCTION TO MOVE DATA — 500

THE INSTRUCTION IS A SINGLE ARCHITECTED INSTRUCTION — 502

EXECUTE THE INSTRUCTION, THE EXECUTING INCLUDING — 504

MOVING DATA OF A SPECIFIED LENGTH FROM A SOURCE LOCATION TO A DESTINATION LOCATION IN A RIGHT-TO-LEFT DIRECTION TO PROVIDE A PREDICTABLE RESULT — 506

A PORTION OF THE DESTINATION LOCATION IS CONTAINED WITHIN THE SOURCE LOCATION FROM WHICH THE DATA IS BEING MOVED — 508

---

THE SOURCE LOCATION IS ONE SIZE IN BYTES AND THE DESTINATION LOCATION IS ANOTHER SIZE IN BYTES — 510

THE PORTION OF THE DESTINATION LOCATION INCLUDES ONE OR MORE BYTES OF THE DESTINATION LOCATION THAT OVERLAP ONE OR MORE BYTES OF THE SOURCE LOCATION — 512

THE ONE OR MORE BYTES OF THE DESTINATION LOCATION INCLUDES A LEFTMOST BYTE OF THE DESTINATION LOCATION — 514

A LEFTMOST BYTE OF THE SOURCE LOCATION IS OUTSIDE THE DESTINATION LOCATION — 516

THE ONE SIZE IN BYTES AND THE OTHER SIZE IN BYTES IS A SAME SIZE — 518

FIG. 5A

THE SPECIFIED LENGTH OF DATA TO BE MOVED IS SPECIFIED BY A LOCATION ASSOCIATED WITH THE INSTRUCTION — 520

THE LOCATION IS AN IMPLIED REGISTER ASSOCIATED WITH THE INSTRUCTION — 522

THE SOURCE LOCATION IS SPECIFIED USING ONE OR MORE FIELDS OF THE INSTRUCTION — 524

THE DESTINATION LOCATION IS SPECIFIED USING ONE OR MORE OTHER FIELDS OF THE INSTRUCTION — 526

THE EXECUTING IS PERFORMED BY A PROCESSOR OF THE COMPUTING ENVIRONMENT, AND A SEQUENCE OF ACCESSES OF THE SOURCE LOCATION AND THE DESTINATION LOCATION TO MOVE THE DATA, AS OBSERVED BY THE PROCESSOR, IS IN A RIGHT-TO-LEFT DIRECTION, BUT THE SEQUENCE OF ACCESSES AS OBSERVED BY ONE OR MORE OTHER PROCESSORS IS UNDEFINED — 528

THE EXECUTING IS PERFORMED BY A PROCESSOR AND THE MOVING THE DATA INCLUDES

COPYING THE DATA FROM THE SOURCE LOCATION TO AN INTERNAL BUFFER — 530

MOVING THE DATA FROM THE INTERNAL BUFFER TO THE DESTINATION LOCATION — 532

THE DATA APPEARS, AS OBSERVED BY THE PROCESSOR, TO BE MOVED IN A RIGHT-TO-LEFT DIRECTION, AND AS OBSERVED BY ONE OR MORE OTHER PROCESSORS, IN AN UNDETERMINED DIRECTION — 534

FIG. 5B

INSTRUCTION TO MOVE DATA IN A RIGHT-TO-LEFT DIRECTION

BACKGROUND

One or more aspects relate, in general, to facilitating processing within a computing environment, and in particular, to facilitating processing associated with moving data.

A common task in computer programming is to insert an element into a particular location in an array. To do this, all elements starting at the location to be inserted, through the end of the array are moved one element higher in the array. Then, the new element is stored in the array at the insertion point. This moving of existing elements is to start at the highest numbered element and go down in addresses to the existing element at the insertion point.

Many computer instruction set architectures provide a mechanism to copy data from one location to another. For example, the Intel x86 architecture has the REP MOVS instruction. Further, the z/Architecture® hardware architecture offered by International Business Machines Corporation, Armonk, N.Y., has a Move Character (MVC) instruction. These move-type instructions process data in a left-to-right manner (e.g., beginning at a lower location in memory, and proceeding to a higher location). Therefore, using one of these move-type instructions to move N existing elements starting at element P one element higher results in replicating an array element P at array elements P+1 through N+1. Using these instructions would not provide the desired result for the above programming paradigm of moving elements in an array to a higher index to insert a new element. Instead, the compiler uses a sequence of instructions that are typically slower than the native move-type instruction for a given instruction set architecture.

SUMMARY

Shortcomings of the prior art are overcome, and additional advantages are provided through the provision of a computer program product for facilitating processing within a computing environment. The computer program product includes a computer readable storage medium readable by a processing circuit and storing instructions for performing a method. The method includes obtaining an instruction to move data, the instruction being a single architected instruction. The instruction is executed, and the executing includes moving data of a specified length from a source location to a destination location in a right-to-left direction to provide a predictable result. A portion of the destination location is contained within the source location from which the data is being moved.

By using a single architected instruction to move data in a right-to-left direction, certain tasks may be performed, such as inserting an element into an array, much more efficiently than using a software paradigm. The data movement is performed much faster, reducing execution time, and improving processor and/or overall system performance.

As one example, the source location is one size in bytes and the destination location is another size in bytes. In one example, the one size in bytes and the other size in bytes is a same size. Further, in one example, the portion of the destination location includes one or more bytes of the destination location that overlap one or more bytes of the source location. For instance, the one or more bytes of the destination location includes a leftmost byte of the destination location. However, in one example, a leftmost byte of the source location is outside the destination location.

Even though there is overlap in the source and destination locations, the result is still predictable enabling the instruction to be used to move data in a right-to-left direction for use in one or more tasks.

In one embodiment, the specified length of data to be moved is specified by a location associated with the instruction. The location is, for instance, an implied register associated with the instruction.

As examples, the source location is specified using one or more fields of the instruction, and the destination location is specified using one or more other fields of the instruction.

In one embodiment, the executing is performed by a processor of the computing environment, and a sequence of accesses of the source location and the destination location to move the data, as observed by the processor, is in a right-to-left direction, but the sequence of accesses as observed by one or more other processors is undefined.

Moreover, in one embodiment, the executing is performed by a processor of the computing environment, and the moving the data includes copying the data from the source location to an internal buffer. The data is then moved from the internal buffer to the destination location. The data appears, as observed by the processor, to be moved in a right-to-left direction and, as observed by one or more other processors, in an undetermined direction. Thus, the moving the data may be implemented in a number of ways, including moving the data right-to-left in a sequence or moving the data to an internal buffer and then moving it from the internal buffer to the destination location. In the latter case, as observed by the processor, the data appears to be moved right-to-left since any byte locations that overlap are not copied (replicated) but instead, appear to be moved.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 5A-5B depict one example of facilitating processing within a computing environment, in accordance with an aspect of the present invention;

DETAILED DESCRIPTION

In accordance with an aspect of the present invention, a capability is provided to facilitate processing within a computing environment. As one example, a single instruction (e.g., a single architected hardware machine instruction at the hardware/software interface) is provided to move data in a right-to-left direction. The instruction, referred to herein as the Move Right to Left instruction, is part of a general-purpose processor instruction set architecture (ISA), which is dispatched by a program on a processor, such as a general-purpose processor.

Figure 1A:
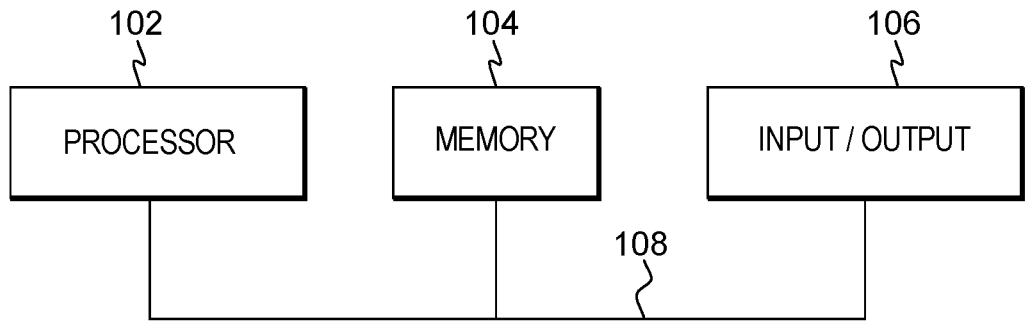
FIG. 1A depicts one example of a computing environment to incorporate and use one or more aspects of the present invention.

One embodiment of a computing environment to incorporate and use one or more aspects of the present invention is described with reference to FIG. 1A. A computing environment 100 includes, for instance, a processor 102 (e.g., a central processing unit), a memory 104 (e.g., main memory; a.k.a., system memory, main storage, central storage, storage), and one or more input/output (I/O) devices and/or interfaces 106 coupled to one another via, for example, one or more buses 108 and/or other connections.

In one example, processor 102 is based on the z/Architecture hardware architecture, and is part of a server, such as an IBM Z® server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, 12$^{th}$ edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system, offered by International Business Machines Corporation, Armonk, N.Y.

Figure 1B:
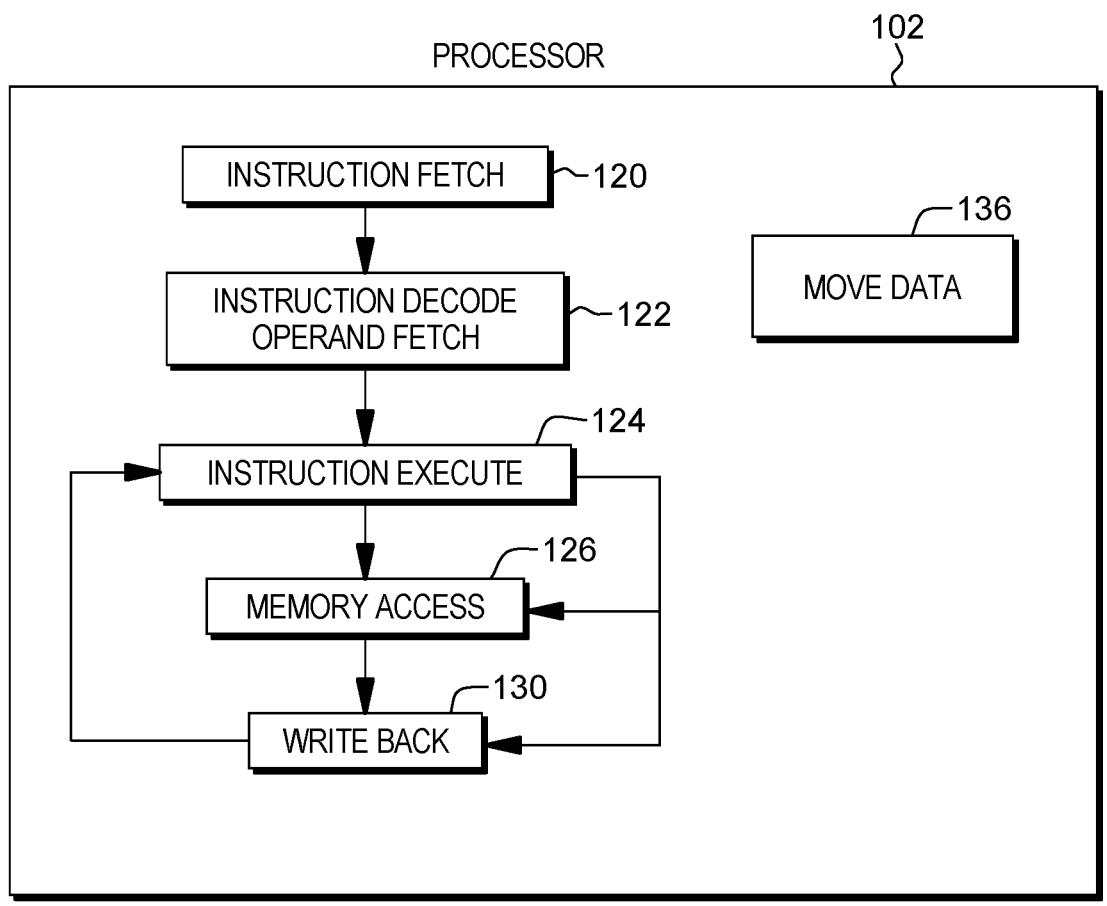
FIG. 1B depicts further details of a processor of FIG. 1A, in accordance with one or more aspects of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with one or more aspects of the present invention, include at least a portion of or have access to one or more other components used in moving data from right to left (or other processing that may use one or more aspects of the present invention), as described herein. The one or more other components include, for instance, a move data component (or other component) 136.

Another example of a computing environment to incorporate and use one or more aspects of the present invention is described with reference to FIG. 2. In one example, the computing environment is based on the z/Architecture hardware architecture; however, the computing environment may be based on other architectures offered by International Business Machines Corporation or others.

Figure 2:
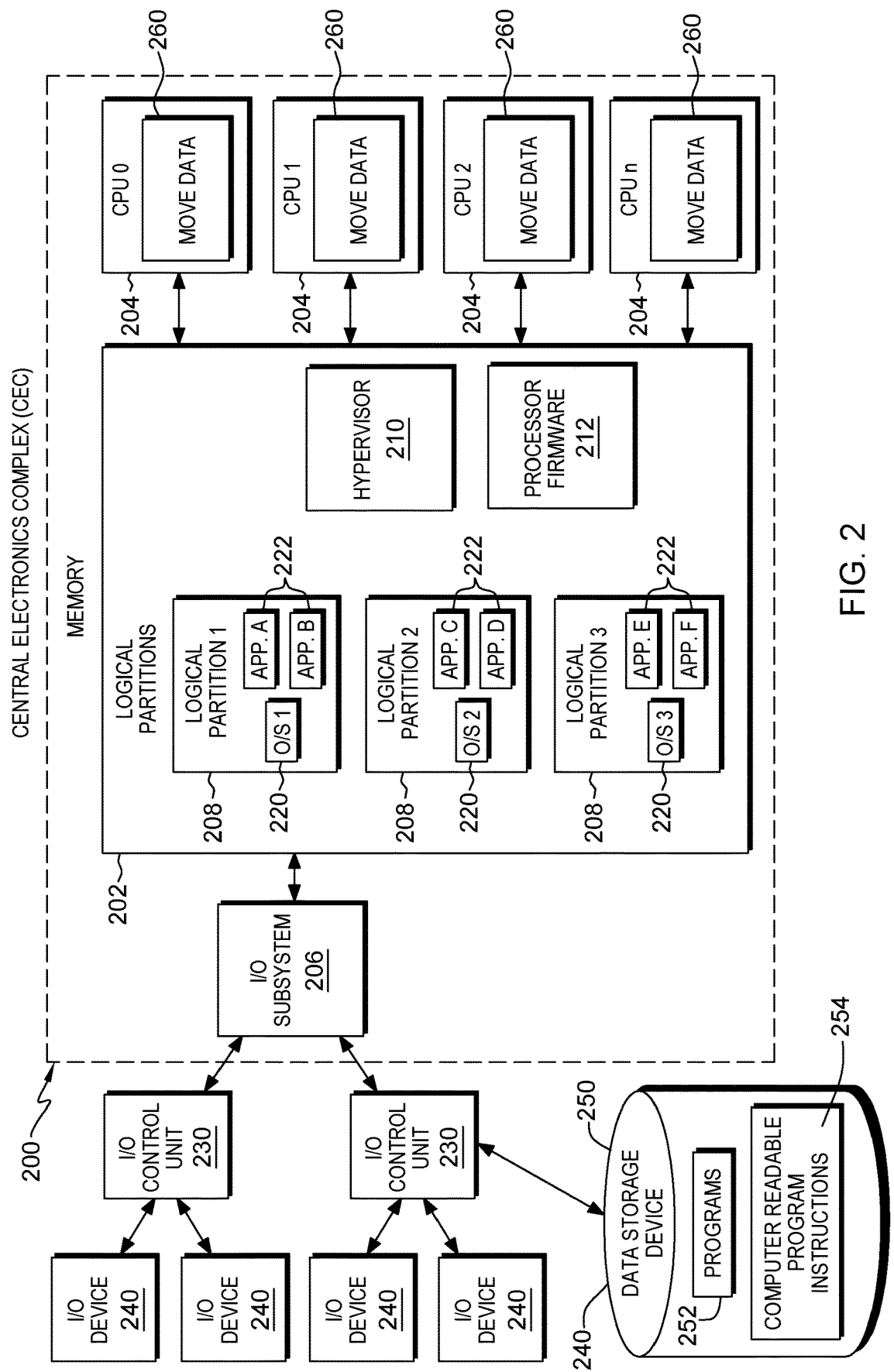
FIG. 2 depicts another example of a computing environment to incorporate and use one or more aspects of the present invention.

Referring to FIG. 2, in one example, the computing environment includes a central electronics complex (CEC) 200. CEC 200 includes a plurality of components, such as, for instance, a memory 202 (a.k.a., system memory, main memory, main storage, central storage, storage) coupled to one or more processors (a.k.a., central processing units (CPUs)) 204, and to an input/output subsystem 206.

Memory 202 includes, for example, one or more logical partitions 208, a hypervisor 210 that manages the logical partitions, and processor firmware 212. One example of hypervisor 210 is the Processor Resource/System Manager (PR/SM') hypervisor, offered by International Business Machines Corporation, Armonk, N.Y. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Each logical partition 208 is capable of functioning as a separate system. That is, each logical partition can be independently reset, run a guest operating system 220 such as a z/OS operating system, or another operating system, and operate with different programs 222. An operating system or application program running in a logical partition appears to have access to a full and complete system, but in reality, only a portion of it is available.

Memory 202 is coupled to processors (e.g., CPUs) 204, which are physical processor resources that may be allocated to the logical partitions. For instance, a logical partition 208 includes one or more logical processors, each of which represents all or a share of a physical processor resource 204 that may be dynamically allocated to the logical partition.

Further, memory 202 is coupled to I/O subsystem 206. I/O subsystem 206 may be a part of the central electronics complex or separate therefrom. It directs the flow of information between main storage 202 and input/output control units 230 and input/output (I/O) devices 240 coupled to the central electronics complex.

Many types of I/O devices may be used. One particular type is a data storage device 250. Data storage device 250 may store one or more programs 252, one or more computer readable program instructions 254, and/or data, etc. The computer readable program instructions may be configured to carry out functions of embodiments of aspects of the invention.

As one example, each processor 204 includes and/or has access to a move data component (or other component) 260 used in moving data from right to left (and/or other operations of one or more aspects of the present invention). In various examples, there may be one or more components performing these functions. Many variations are possible.

Central electronics complex 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 200. Examples include, but are not limited to: microcode, device drivers, redundant processing units, external disk drive arrays, RAID systems, tape drives, and data archival storage systems, etc.

Further, central electronics complex 200 may be operational with numerous other general-purpose or special purpose computing system environments or configurations. Examples of well-known computing systems, environments, and/or configurations that may be suitable for use with central electronics complex 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects of the present invention may be used with many types of environments. The computing environments provided herein are only examples.

As indicated above, a common task in computer programming is to insert one or more elements into a particular location in an array. To do this, all elements starting at the location to be inserted through the end of the array are moved one or more elements higher in the array. Then, the new element(s) is (are) stored in the array at the insertion point. This moving of existing elements is to start, for instance, at the highest numbered element and go down in addresses to the existing element at the insertion point.

As an example, in the C language, movement of the elements may be coded as indicated below. Assume there are N elements currently in the array and a new element is to be inserted at location P.

for (int $i=N;i>=P;i--$)

array[$i+1$]=array[$i$];

Conventionally, lower numbered array elements and addresses in memory are considered on the left, and higher numbered array elements and addresses are considered on the right. Thus, in one example, data is to be moved in a right-to-left direction.

In accordance with an aspect of the present invention, an instruction, i.e., a single architected hardware instruction, referred to as a Move Right to Left instruction, is provided to move data in a right-to-left direction. The single architected instruction, which moves data right-to-left (instead of left-to-right as conventional), is used in one example, directly by a compiler to implement the following loop:

for (int $i=N; i>=P; i--$)

array[$i+1$]=array[$i$].

Using the instruction to insert an element in an array is significantly faster than using discrete instructions in the loop or using an immediate software buffer. Processing within the computer, as well as the processing of tasks, is facilitated, improving system performance.

Further, although one example of using the Move Right to Left instruction is to insert an element in an array, the Move Right to Left instruction may be used to perform other tasks in which data is to be moved in a right-to-left direction.

One embodiment of a Move Right to Left instruction used to move data from right to left is described with reference to FIGS. 3A-3B. The instruction is executed, in one example, using a general-purpose processor (e.g., processor 102 or 204). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit may be set to a different value, such as the opposite value or to another value, in other examples. Many variations are possible.

Figure 3A:
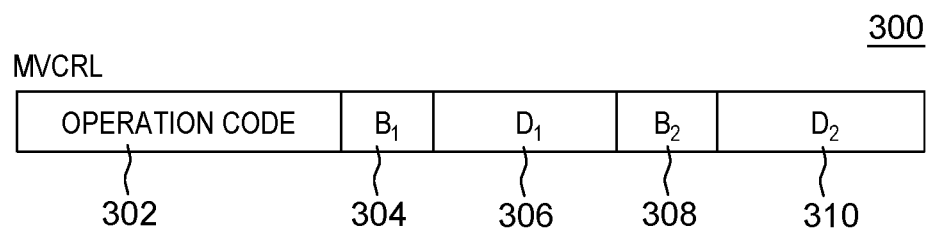
FIG. 3A depicts one format of a Move Right to Left instruction, in accordance with an aspect of the present invention.
Figure 3B:
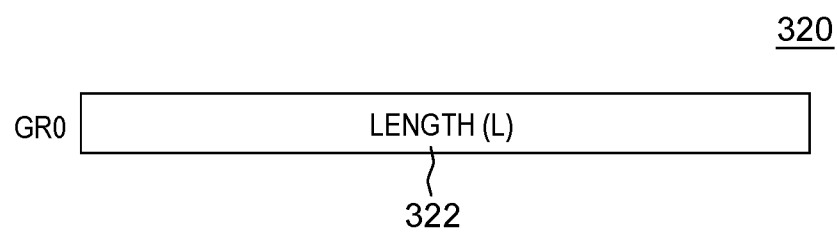
FIG. 3B depicts one example of a field of an implied register, general register 0, used by the instruction, in accordance with an aspect of the present invention.

Referring to FIG. 3A, in one example, a format of a Move Right to Left (MVCRL) instruction 300 is an SSE format that denotes a storage and storage operation with an extended operation code (opcode) field. As an example, the instruction includes an operation code field 302 (e.g., bits 0-15) having an operation code indicating a move right to left operation; a first base field ($B_1$) 304 (e.g., bits 16-19) designating a general register to be used by the instruction; a first displacement field ($D_1$) 306 (e.g., bits 20-31) providing a first displacement; a second base field ($B_2$) 308 (e.g., bits 32-35) designating another general register to be used by the instruction; and a second displacement field ($D_2$) 310 (e.g., bits 36-47) providing a second displacement. In one example, the displacements, $D_1$ and $D_2$, are treated as 12-bit unsigned binary integers. As an example, the contents of the general register designated by $B_1$ field 304 are added to the contents of $D_1$ field 306 to form an address of the first operand (in storage); and contents of the general register designated by $B_2$ field 308 are added to the contents of $D_2$ field 310 to form an address of the second operand (in storage). Both operand addresses designate, for instance, the leftmost byte of the respective operands. Each of the fields 304-310, in one example, is separate and independent from the opcode field. Further, in one embodiment, they are separate and independent from one another; however, in other embodiments, more than one field may be combined.

In one embodiment, execution of the instruction includes the use of an implied general register (i.e., a register not explicitly designated by the instruction), such as general register 0, GR0. As shown in FIG. 3B, contents of general register 0 (320) include a length (L) 322. For instance, bits 56-63 of general register 0 include the length of the first and second operands. Further, in one example, bits 32-55 of general register 0 should contain zeros; otherwise the program may not operate compatibly in the future. Bits 0-31 of general register 0 are ignored in this embodiment. As an example, L specifies the number of bytes to the right of the first byte of each operand. Therefore, the length in bytes of each operand is 1-256, corresponding to the length code in L of 0-255. Although in one example, the length is provided in an implied register, in other examples, it may be provided in a field of the instruction, or a register or other location specified by the instruction. Many possibilities exist.

In execution of the Move Right to Left instruction, the second operand (located, e.g., using the second operand address) is placed at the first operand location (specified by the first operand address) by, e.g., moving bytes in a right-to-left sequence, beginning with the rightmost byte of each operand. The result is obtained as if both operands are processed from right to left. However, as observed by other CPUs and channel programs, the sequence of accesses to the operands are undefined. Either operand may wrap around from location $2^{24}-1$ to 0 in the 24-bit addressing mode, from location $2^{31}-1$ to 0 in the 31-bit addressing mode or from location $2^{64}-1$ to 0 in the 64-bit addressing mode.

Results are unpredictable when the byte location designated by the second operand address (the leftmost byte of the source) overlaps with any byte location of the first operand (the destination), other than the byte location designated by the first operand address (the leftmost byte of the destination).

In one example, the condition code remains unchanged.
Example Program Exceptions include:
Access (fetch, operand 2; store, operand 1)
Operation (if the miscellaneous instruction extensions facility 3 is not installed (e.g., facility indication bit 61 is not set to one)
Transaction Constraint
Example Programming Notes include:
1. The Move Right To Left instruction can be used, for instance, to open a hole in an array, for subsequent insertion of an element, by moving the original element and all higher elements to the right. Instructions, such as the Move Character instruction, which move left to right, cannot be used in this case since they would destructively overwrite the array elements.
2. For most other instructions with more than one storage operand, destructive overlap occurs when the leftmost byte of the destination operand lies within the source operand and the two operands do not perfectly overlap. However, for the Move Right To Left instruction, destructive overlap occurs when the rightmost byte of the destination operand lies within the source operand and does not perfectly overlap the source operand. Therefore, the scenario described in programming note 1 is not destructive overlap for MVCRL, but would be if a Move Character (MVC) instruction of the z/Architecture hardware architecture was used.

In one embodiment, a hardware implementation that uses an internal buffer disables destructive overlap checking. For instance, the hardware (e.g., of a processor or other hardware coupled to the processor) fetches the entire source operand into an internal hardware buffer before storing to the destination operand. The hardware that executes this has large internal buffers that are not visible to other CPUs that are fetching the destination operand being stored by this CPU.

Thus, in accordance with an aspect of the present invention, the Move Right to Left instruction may be implemented in at least two ways: (1) the processor moves the data right to left, and then the other processors only observe the right to left ordering; or (2) the processor moves the entire source data to an internal hardware buffer, and then moves it to its destination, where this storing of the target data could be performed in any order (e.g., in an undetermined direction, left-to-right, right-to-left, etc.). For the latter case, since the data was first copied to an internal hardware buffer, as observed by this processor, the data appears to be moving right to left, since any byte locations that overlap are not copied (replicated), but instead, appear to be moved; as observed by other processors, the data is moved, e.g., in an undetermined direction.

Further details of one embodiment of processing based on execution of the Move Right to Left instruction, in accordance with an aspect of the present invention, are described with reference to FIG. 4. In one example, a processor, such as a general processor 102 or 204, is used to execute the instruction. In one example, hardware of the processor is used to execute the instruction. The hardware may be within the processor or coupled thereto for purposes of receiving the instruction from the processor, which, e.g., obtains, decodes and sets-up the instruction to execute on the hardware. Other variations are possible.

Figure 4:
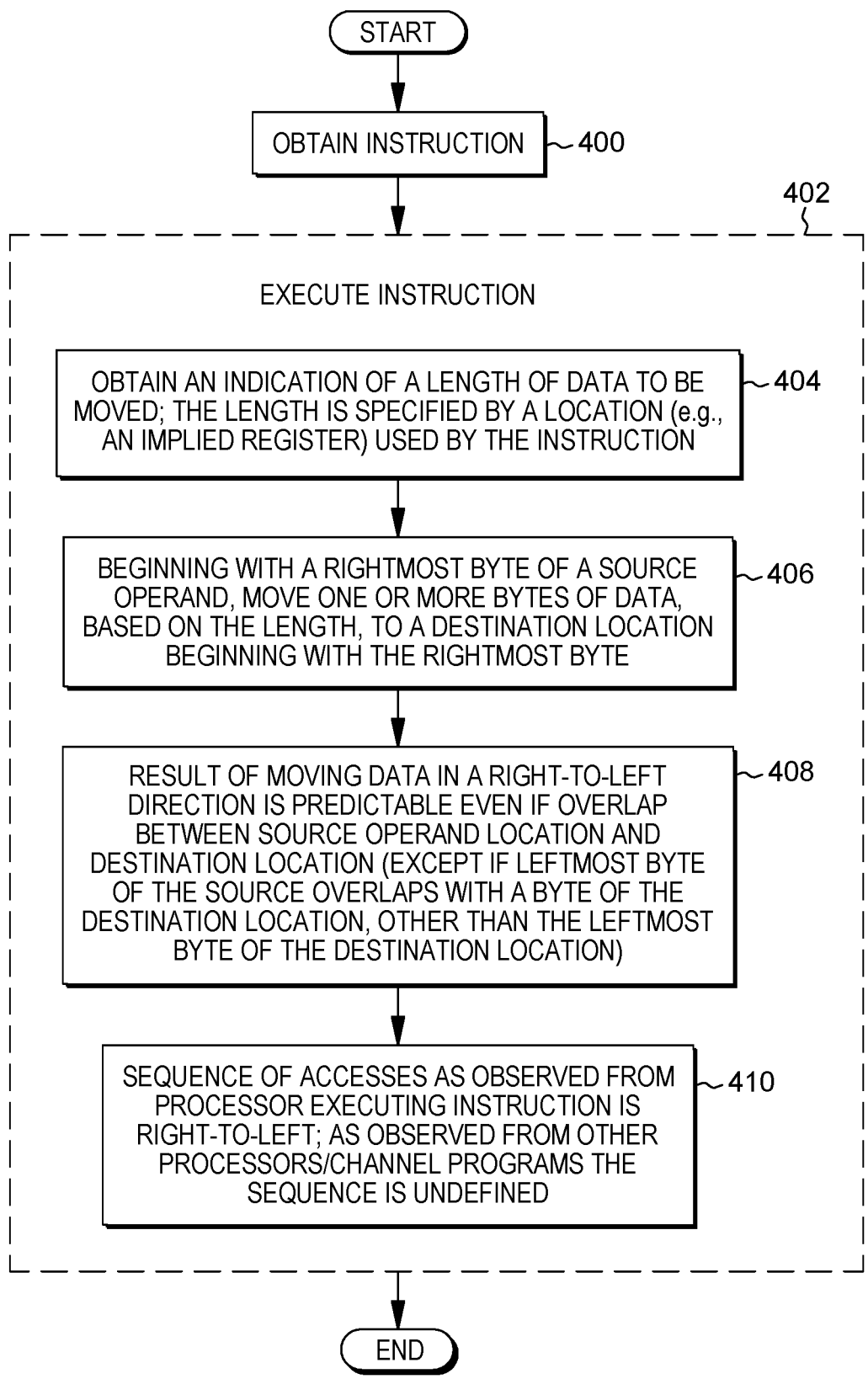
FIG. 4 depicts one example of processing associated with execution of the Move Right to Left instruction, in accordance with an aspect of the present invention.

Referring to FIG. 4, initially, an instruction, referred to as the Move Right to Left instruction (e.g., MVCRL instruction 300) is obtained (e.g., fetched, received, provided, etc.), STEP 400, and executed, STEP 402. The executing includes, for instance, obtaining an indication of a length of data to be moved, STEP 404. The length (e.g., L 322) is specified by a location used by the instruction (e.g., an implied register, such as general register 0 (320)).

Beginning with, for instance, a rightmost byte of a source operand (the location of which is specified using fields of the instruction (e.g., $B_1$, $D_1$)), one or more bytes of data are moved from the source operand to a destination location (e.g., specified using fields of the instruction (e.g., $B_2$, $D_2$)) beginning, for instance, at the rightmost byte, STEP 406. The amount of data moved (e.g., the number of bytes moved) depends on the length obtained from, e.g., general register 0.

A result of moving the data in a right-to-left direction (i.e., the moved data) is predictable even if there is an overlap between the source operand location and destination location (except if the leftmost byte of the source operand location overlaps with a byte of the destination location, other than the leftmost byte of the destination location), STEP 408.

In one example, a sequence of accesses used to perform the move data from right-to-left, as observed from the processor executing the instruction, is right-to-left; and as observed from other processors/channel programs, the sequence of accesses is undefined, STEP 410.

As described herein, in one aspect, a single instruction (e.g., a single architected machine instruction at the hardware/software interface, e.g., Move Right to Left instruction) is provided to move data in a right-to-left direction. This instruction is, for instance, a hardware instruction defined in an instruction set architecture (ISA). As a result, the complexity of a program related to moving data in a right-to-left direction is reduced. Further, performance of the operation, and thus, the processor, is improved. Processing is faster, execution times are reduced, and performance is improved.

Although various fields and registers of the Move Right to Left instruction are described, one or more aspects of the present invention may use other, additional or fewer fields or registers, or other sizes of fields and registers, etc. Many variations are possible. For instance, implied registers may be used instead of explicitly specified registers or fields of the instruction and/or explicitly specified registers or fields may be used instead of implied registers or fields. Other variations are also possible.

One or more aspects of the present invention are inextricably tied to computer technology and facilitate processing within a computer, improving performance thereof. The use of a single architected machine instruction to move data in a right-to-left direction improves performance within the computing environment by reducing complexity and increasing processing speed. The data and/or instruction may be used in many technical fields, such as in computer processing, medical processing, security, etc. By providing optimizations in moving the data, these technical fields are improved by reducing execution time.

Further details of one embodiment of facilitating processing within a computing environment, as it relates to one or more aspects of the present invention, are described with reference to FIGS. 5A-5B.

Referring to FIG. 5A, in one embodiment, an instruction to move data is obtained (500). The instruction is a single architected instruction (502). The instruction is executed (504), and the executing includes moving data of a specified length from a source location to a destination location in a right-to-left direction to provide a predictable result (506). A portion of the destination location is contained within the source location from which the data is being moved (508).

As an example, the source location is one size in bytes and the destination location is another size in bytes (510). The portion of the destination location includes, for instance, one or more bytes of the destination location that overlap one or more bytes of the source location (512). The one or more bytes of the destination location includes a leftmost byte of the destination location (514). Further, in one example, a leftmost byte of the source location is outside the destination location (516). Moreover, as an example, the one size in bytes and the other size in bytes is a same size (518).

As one example, referring to FIG. 5B, the specified length of data to be moved is specified by a location associated with the instruction (520). The location is, for instance, an implied register associated with the instruction (522).

Further, in one example, the source location is specified using one or more fields of the instruction (524); and the destination location is specified using one or more other fields of the instruction (526).

In one aspect, the executing is performed by a processor of the computing environment, and a sequence of accesses of the source location and the destination location to move the data, as observed by the processor, is in a right-to-left direction, but the sequence of accesses as observed by one or more other processors is undefined (528).

In one embodiment, the executing is performed by a processor of the computing environment and the moving the data includes copying the data from the source location to an internal buffer (530), and moving the data from the internal buffer to the destination location (532). The data appears, as observed by the processor, to be moved in a right-to-left direction and, as observed by one or more other processors, in an undetermined direction (534).

Although the examples herein describe moving bytes of data, data units of other sizes may be moved. Bytes are only one example. Other variations and embodiments are possible.

Figure 6A:
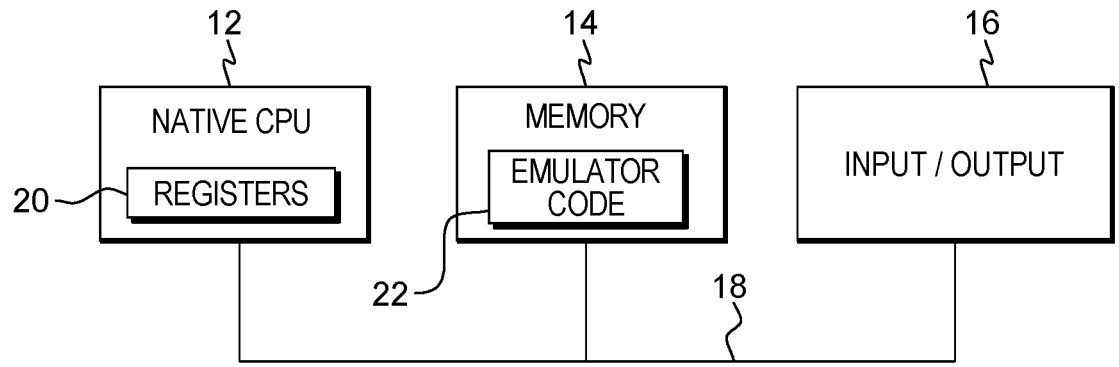
FIG. 6A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 6A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 6B:
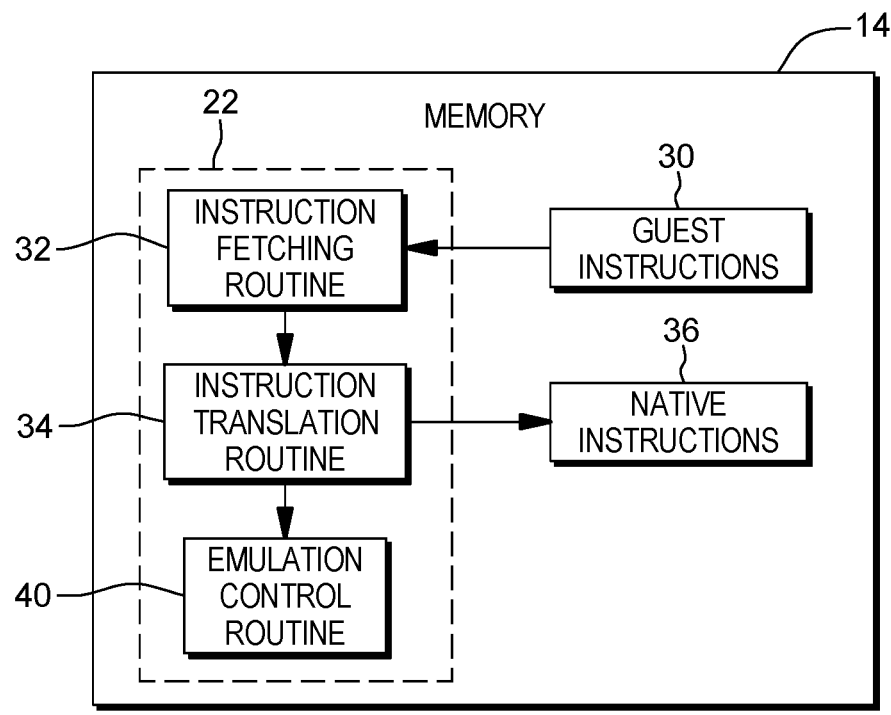
FIG. 6B depicts further details of the memory of FIG. 6A.

Further details relating to emulator code 22 are described with reference to FIG. 6B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment.

Each computing environment is capable of being configured to include one or more aspects of the present invention. For instance, each may be configured to provide move data processing, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
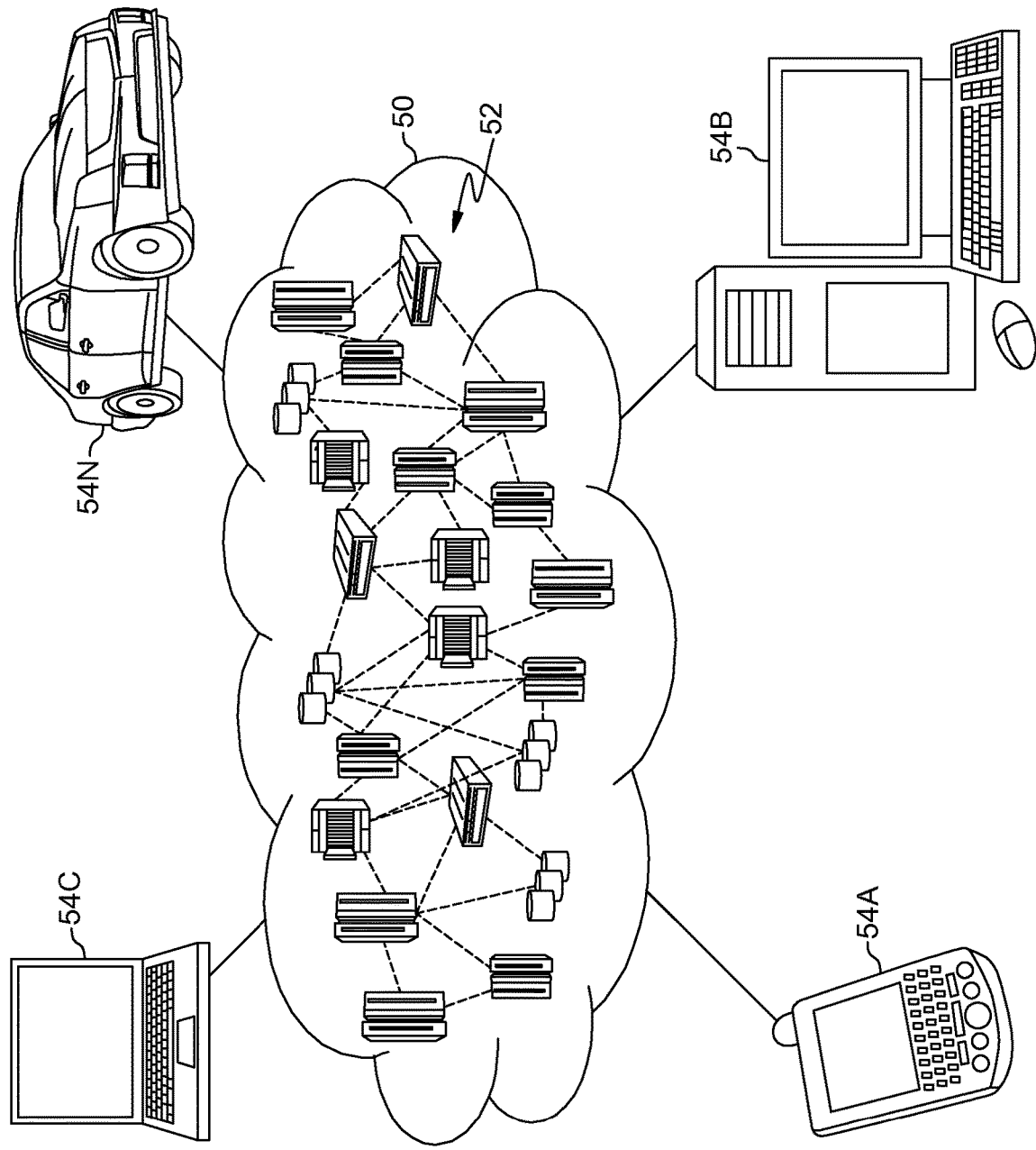
FIG. 7 depicts one embodiment of a cloud computing environment.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
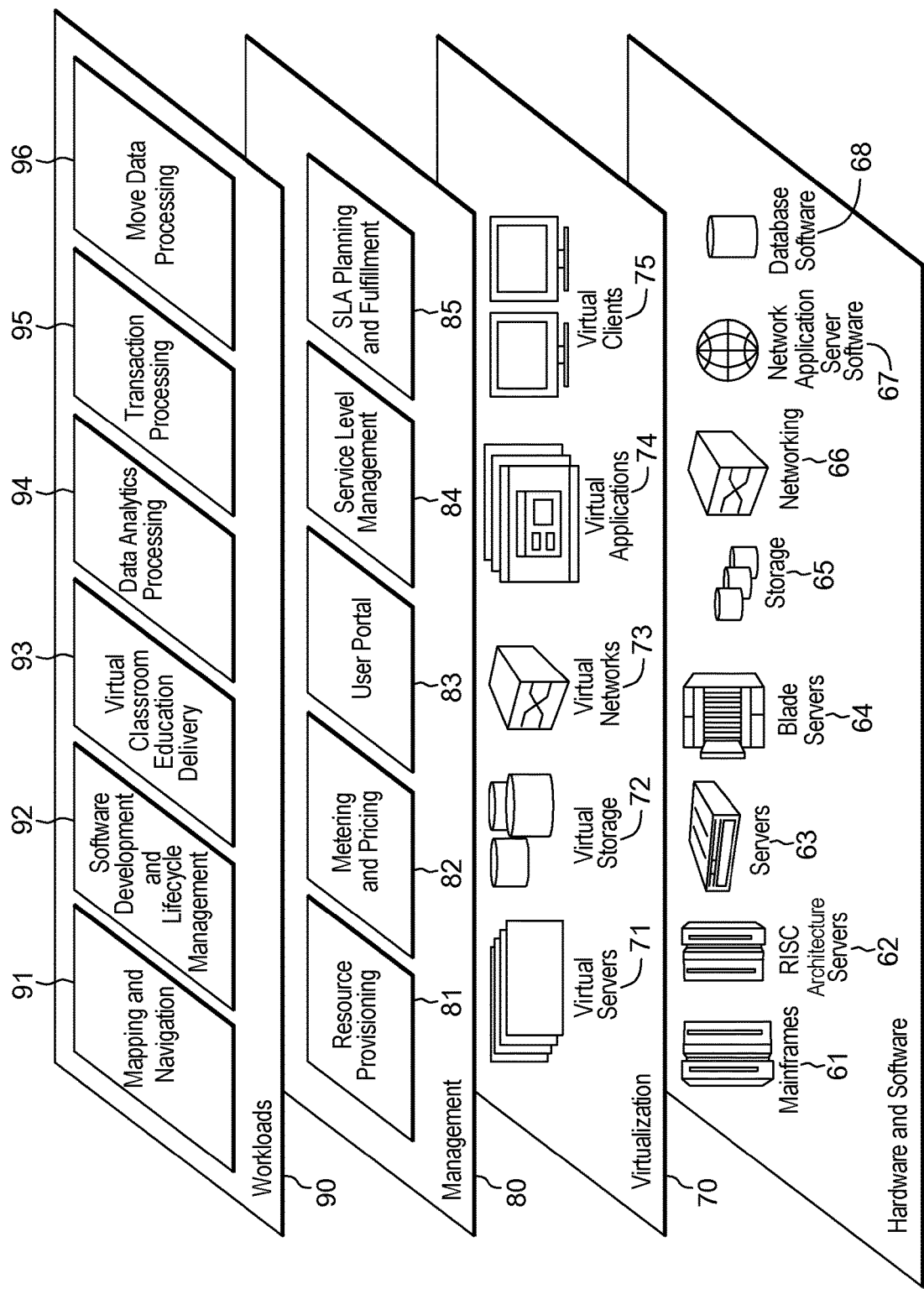
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and move data processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different sizes of data to be moved may be specified and/or other fields, sizes of fields, etc. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium readable by at least one processing circuit and storing instructions for performing a method comprising:
   obtaining an instruction to move data, the instruction being a single architected instruction; and
   executing the instruction, the executing comprising:
   moving data of a set of data to provide an insertion point in the set of data to add other data, the moving data comprising moving a specified length of the data from a source location within the set of data to a destination location in a right-to-left direction to provide a predictable result, wherein a portion of the destination location is contained within the source location from which the data is being moved.

2. The computer program product of claim 1, wherein the source location is one size in bytes and the destination location is another size in bytes, and wherein the portion of the destination location includes one or more bytes of the destination location that overlap one or more bytes of the source location.

3. The computer program product of claim 2, wherein the one or more bytes of the destination location includes a leftmost byte of the destination location.

4. The computer program product of claim 2, wherein a leftmost byte of the source location is outside the destination location.

5. The computer program product of claim 2, wherein the one size in bytes and the other size in bytes is a same size.

6. The computer program product of claim 1, wherein the specified length of data to be moved is specified by a location associated with the instruction.

7. The computer program product of claim 1, wherein the moving data comprises moving one or more units of data of a defined size from the source location to the destination location in a right-to-left sequence beginning with a rightmost unit of data of the defined size in the source location.

8. The computer program product of claim 1, wherein the source location is specified using one or more fields of the instruction, and the destination location is specified using one or more other fields of the instruction.

9. The computer program product of claim 1, wherein the executing is performed by a processor of the computing environment, and wherein a sequence of accesses of the source location and the destination location to move the data, as observed by the processor, is in a right-to-left direction, but the sequence of accesses as observed by one or more other processors is undefined.

10. The computer program product of claim 1, wherein the executing is performed by a processor of the computing environment, and wherein the moving data comprises:
   copying the data from the source location to an internal buffer; and
   moving the data from the internal buffer to the destination location,
   wherein the data appears, as observed by the processor, to be moved in a right-to-left direction, and as observed by one or more other processors, in an undetermined direction.

11. A computer system for facilitating processing within a computing environment, the computer system comprising:
   a memory; and
   a processor in communication with the memory, wherein the computer system is configured to perform a method, said method comprising:
      obtaining an instruction to move data, the instruction being a single architected instruction; and
      executing the instruction, the executing comprising:
         moving data of a set of data to provide an insertion point in the set of data to add other data, the moving data comprising moving a specified length of the data from a source location within the set of data to a destination location in a right-to-left direction to provide a predictable result, wherein a portion of the destination location is contained within the source location from which the data is being moved.

12. The computer system of claim 11, wherein the source location is one size in bytes and the destination location is another size in bytes, and wherein the portion of the destination location includes one or more bytes of the destination location that overlap one or more bytes of the source location.

13. The computer system of claim 12, wherein the one or more bytes of the destination location includes a leftmost byte of the destination location.

14. The computer system of claim 11, wherein the executing is performed by the processor of the computing environment, and wherein a sequence of accesses of the source location and the destination location to move the data, as observed by the processor, is in a right-to-left direction, but the sequence of accesses as observed by one or more other processors is undefined.

15. The computer system of claim 11, wherein the executing is performed by the processor of the computing environment, and wherein the moving data comprises:
   copying the data from the source location to an internal buffer; and
   moving the data from the internal buffer to the destination location,
   wherein the data appears, as observed by the processor, to be moved in a right-to-left direction, and as observed by one or more other processors, in an undetermined direction.

16. A computer-implemented method of facilitating processing within a computing environment, the computer-implemented method comprising:
   obtaining an instruction to move data, the instruction being a single architected instruction; and
   executing the instruction, the executing comprising:
      moving data of a set of data to provide an insertion point in the set of data to add other data, the moving data comprising moving a specified length of the data from a source location within the set of data to a destination location in a right-to-left direction to provide a predictable result, wherein a portion of the destination location is contained within the source location from which the data is being moved.

17. The computer-implemented method of claim 16, wherein the source location is one size in bytes and the destination location is another size in bytes, and wherein the portion of the destination location includes one or more bytes of the destination location that overlap one or more bytes of the source location.

18. The computer-implemented method of claim 17, wherein the one or more bytes of the destination location includes a leftmost byte of the destination location.

19. The computer-implemented method of claim 16, wherein the executing is performed by a processor of the computing environment, and wherein a sequence of accesses of the source location and the destination location to move the data, as observed by the processor, is in a right-to-left direction, but the sequence of accesses as observed by one or more other processors is undefined.

20. The computer-implemented method of claim 16, wherein the executing is performed by a processor of the computing environment, and wherein the moving data comprises:
   copying the data from the source location to an internal buffer; and
   moving the data from the internal buffer to the destination location,
   wherein the data appears, as observed by the processor, to be moved in a right-to-left direction, and as observed by one or more other processors, in an undetermined direction.

* * * * *